United States Patent Office 2,804,163
Patented Aug. 27, 1957

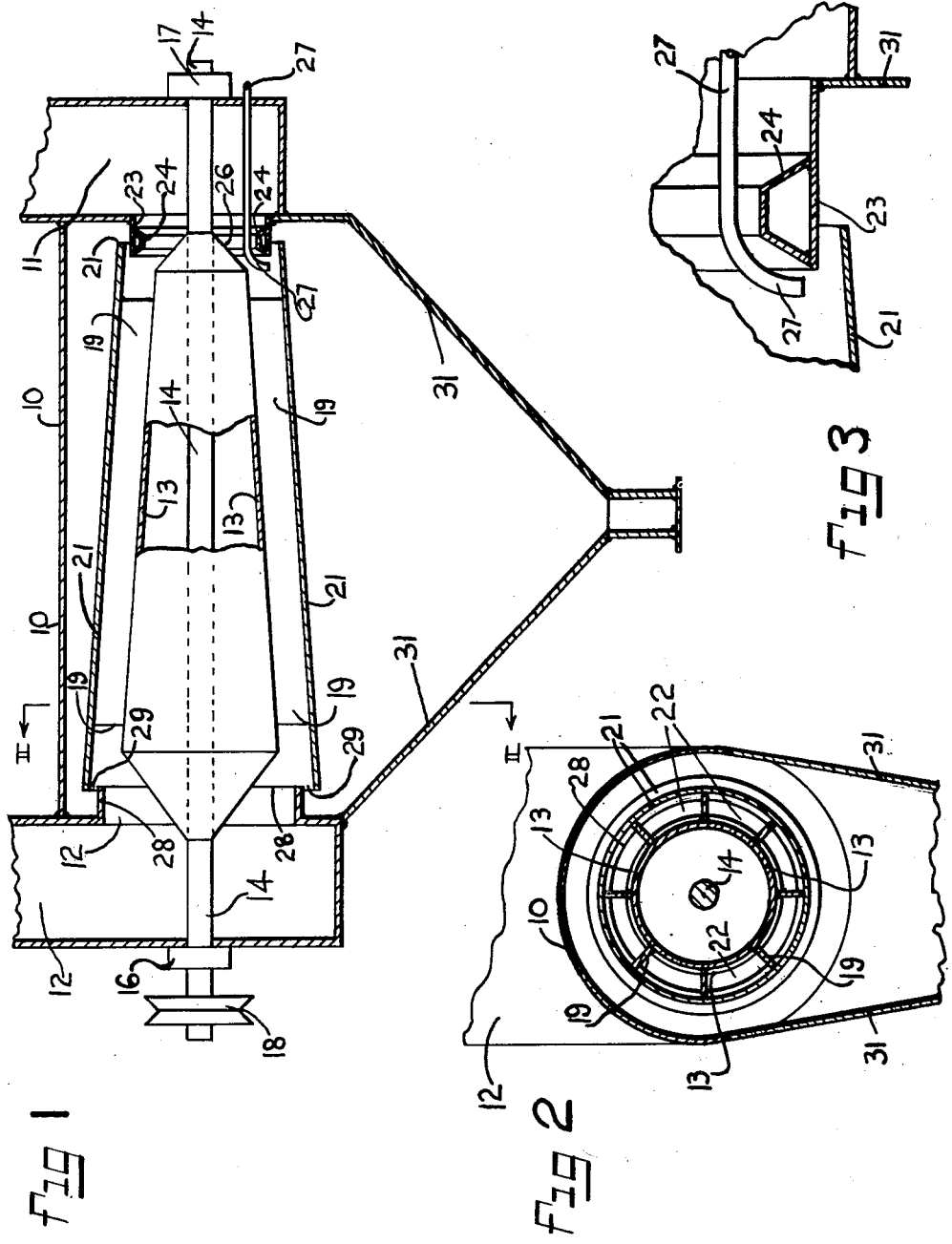

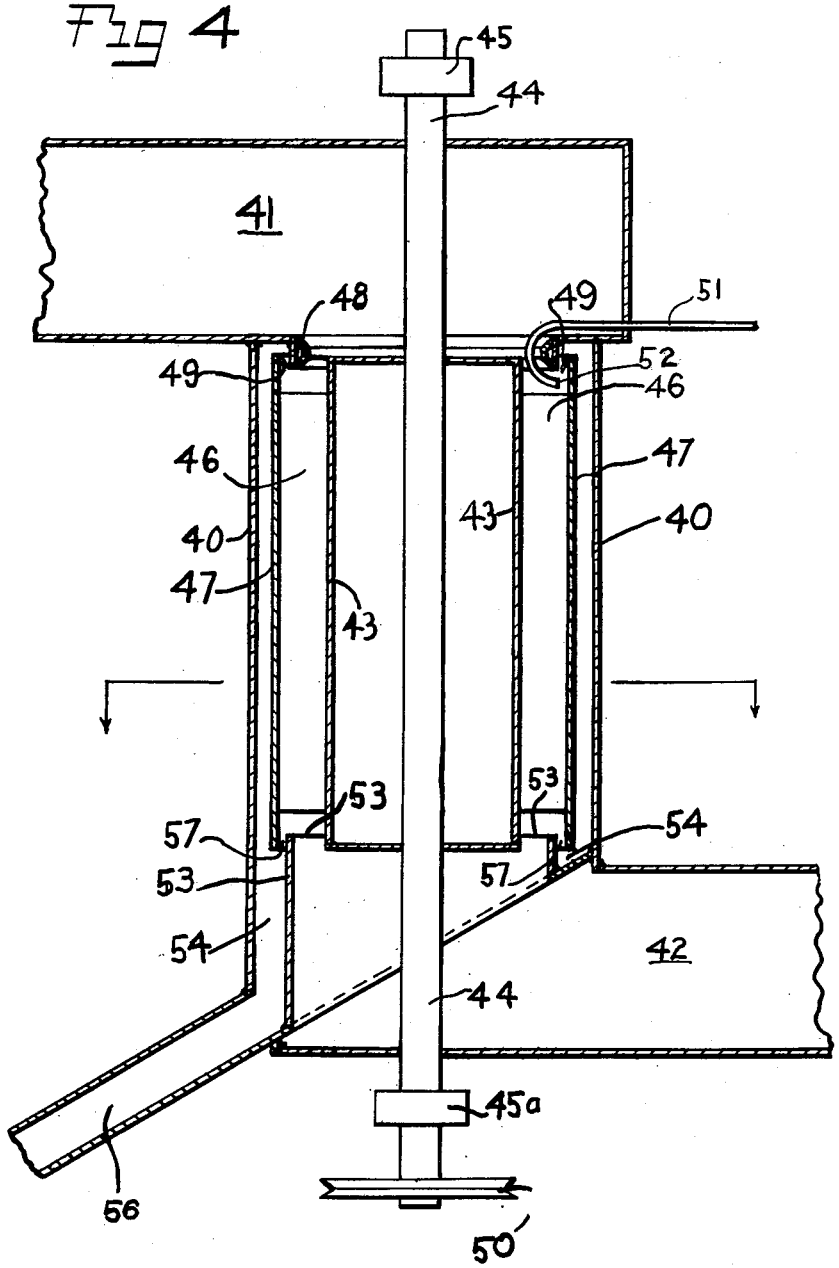

2,804,163

CENTRIFUGAL DUST COLLECTOR

Ellis W. Bullock and Lloyd B. Smith, Birmingham, Ala.

Application July 5, 1955, Serial No. 519,934

2 Claims. (Cl. 183—24)

This invention relates to apparatus for separating solid particles from gases, for convenience referred to as dust collectors, and more particularly to the type wherein the gas to be cleaned is subjected to mechanical rotation at high angular velocity in a confined space to the extent that the solid particles therein are caused to separate from the gas and settle out, and has for an object the provision of apparatus of the character designated in which improved means are provided for the continuous discharge of solids so separated.

In the application of Lloyd B. Smith, Serial No. 458,519, filed September 27, 1954, now Patent No. 2,755,885 dated July 24, 1956, there is shown, described and claimed apparatus in which the gas to be cleaned is subjected to centrifugal force as it flows through a confined channel to the extent that many times the force of gravity is imparted to it and the dust is thus separated from the gas by centrifugal force and is entrapped along the walls of the channels. While the apparatus therein disclosed is highly efficient in operation, it is necessary to stop it periodically in order to discharge the dust so separated. It is accordingly one of the objects of our present invention to provide apparatus wherein the gas to be cleaned is similarly treated and in which a thin film of water is caused to move continuously along the outer walls of the channels to entrain and carry away the solid particles separated from the gas.

Briefly, our invention comprises a housing having an inlet for gas to be cleaned at one end and an outlet for clean gas at the opposite end. Mounted in the housing is an elongated cylinder surrounded by an imperforate wall, open at the ends, which is supported by, and separated from, the cylinder by means of radial vanes forming elongated channels. Means are provided for introducing the gas to be cleaned into the channels and the cylinder is rotated at a velocity sufficient to cause the solid particles to separate out of the gas and settle along the outer imperforate wall. Water is introduced into the channels, preferably at the inlet end, in an amount sufficient to form a thin film which flows continuously along the outer wall and entrains and carries away the solid particles. The cylinder may be disposed either horizontally or vertically. Where disposed horizontally, the cylinder and its outer imperforate wall are flared outwardly from inlet to outlet end a sufficient amount to cause the water to flow along the channels to the outlet end. Means are provided at the outlet end for the separate discharge of the dust laden liquid and the cleaned gas. In the form of our invention wherein the cylinder is disposed vertically, it is preferably made of uniform diameter from end to end and the gas to be cleaned is introduced at the upper end between the cylinder and its imperforate wall and the cleaned gas is discharged at the lower end.

Apparatus embodying features of our invention is illustrated in the accompanying drawings, forming a part of this application in which:

Fig. 1 is a longitudinal sectional elevation showing one form of our improved apparatus;

Fig. 2 is a sectional view taken along the line II—II of Fig. 1;

Fig. 3 is a detail sectional view illustrating the means employed for accelerating the flow of gases at the inlet end of the rotating cylinder; and, Fig. 4 is a sectional elevation showing another form of our improved apparatus.

Referring to the drawings for a better understanding of our invention, we show in Fig. 1 a housing 10 having an inlet 11 for gas to be cleaned and an outlet 12 for cleaned gas at the opposite end. Mounted within the housing 10 is a horizontally disposed, imperforate elongated, frusto-conical cylinder 13 which is mounted on a shaft 14 supported in bearings 16 and 17 at opposite ends of the housing. The cylinder 13 may be rotated from any suitable source of power, not shown, through a pulley 18.

Mounted on the cylinder 13 and extending the major portion of the length thereof is a plurality of radial vanes 19. Surrounding the cylinder 13 and secured to the vanes 19 is an outer imperforate wall, or shell 21, which, with the vanes 19, form a plurality of longitudinal channels 22 around the cylinder 13.

At the inlet end of the housing 10, is mounted a ring 23 which extends a short distance within the inlet end of the outer wall 21 of the cylinder 13. Mounted within the ring 23 is an annular ridge or rib 24 which coacts with the adjacent end 26 of the cylinder 13 to form an inlet nozzle for the gas to be cleaned. Preferably, the adjacent end 26 of the cylinder 13 is formed at a more abrupt flaring angle than the remainder of the cylinder, as shown in Fig. 1, to provide for the smooth entrance of the gas to be cleaned. Thus the gases are caused to enter the channels 22 at an increased velocity and their pressure is decreased at the inlet end of the channels.

At 27 we show a pipe for the admission of water or other suitable liquor into the inlet end of the outer wall 21 of the cylinder 13 and which, as shown, has its discharge end directed against the wall 21. In operation, the cylinder 13 rotates at a very high velocity, say from 2000 to 3000 revolutions per minute, depending upon the diameter of the cylinder, imparting to the solid particles from 800 to 2000 times the force of gravity and the water thus introduced forms a thin film within the outer wall 21 and channels 22 which flows from the inlet to the outlet end of the cylinder.

At the outlet end of the housing, there is provided a ring 28 which is slightly smaller in diameter than the diameter of the outer wall 21 so as to provide a narrow passage therebetween. The speed of rotation of the cylinder 13 being such as to cause the solid particles in the gas to separate out against the outer wall 21, they are entrained in the film of water and discharged through the narrow passage 29 between the ring 28 and the wall 21. The mixture, or slurry of liquor and solid particles thus formed flows into a hopper 31 forming the lower part of the housing 10 and may be disposed of in any suitable manner. If desired, a suitable wetting agent, many of which are known in the art, may be incorporated in the liquor introduced in the conduit 27 whereby to assure complete assimilation of the solid particles into the liquid stream.

It will be apparent from an inspection of Fig. 1 of the drawing that a thin outer layer of the gas passing through the channels 22 will be skimmed off by the ring 28 and pass outwardly around the outside of the outer wall 21. It will also be apparent that the pressure within the housing around the cylinder 13 will be greater than that existing at the inlet end where it passes through the inlet nozzle formed by the ring 23 and end 26 of the cylinder 13. Thus the gas passing out around the ring 28 will flow back to the inlet end of the cylinder 13 and be drawn into the inlet and by reason of the lower pressure existing at that end. This brings about a recirculation of that small proportion of the gas and serves to remove any residual solid particles which it may contain.

Referring now to Fig. 4 of the drawing we show a housing 40 which is vertically disposed and which has a gas inlet 41 at its upper end and an outlet for cleaned gas 42 at its lower end. Mounted within the housing 40 is an elongated imperforate cylinder 43 which is mounted on a shaft 44 supported in bearings 45 and 45a and which may be rotated by any suitable source of power not shown, through a pulley 50. The cylinder 43 is vertically disposed and is of uniform diameter from end to end. Mounted on the cylinder 43 are a plurality of radial vanes 46 which are similar to the vanes 19 in Fig. 1, and which extend longitudinally of the cylinder 43 for the major portion of its length. Mounted on the vanes 46 is an outer imperforate wall 47 which, with the vanes 46 and cylinder 43, forms a plurality of channels extending longitudinally of the cylinder.

At the inlet end of the housing 40 there is provided a nozzle ring 48 which, with the adjacent end of the cylinder 43 forms a restricted passage for the admission of gases into the channels within the outer imperforate wall 47 which, as described previously, increases the velocity and reduces the static pressure of the gases at that point. Also, at the inlet end, the outer wall 47 is provided with an inturned flange 49. Water is admitted into the outer wall 47 through a pipe 51 having its discharge end 52 directed against the wall.

At the outer end of the cylinder 43 there is provided a discharge ring 53, smaller in diameter than the outer wall, and which functions in the same manner as the ring 28 described in the previous modification to skim off the outer layer of gas and to provide a channel for the discharge of liquid and solid particles which are received in an annular passage 54 terminating in a discharge conduit 56. Cleaned gas is discharged within the ring 53 and passes out through the gas outlet 42. The outer layer of gas skimmed off by the ring 53 passes through the narrow passage 57 between the ring and the outer wall 47 and passes to the upper end of the cylinder and is drawn back into the channels between the outer wall 47 and cylinder 43 by reason of the lower pressure existing at the inlet end.

With either modification of our improved invention, the cylinder 43 may be rotated at a velocity such as to impart to the particles from 800 to 2000 times gravity in terms of centrifugal force, whereby the solid particles are caused to separate out from the gas stream and settle against the outer walls 21 or 47, as the case may be to be entrained by and carried away by the film of water. Inasmuch as the centrifugal force imparted by the rotation of the cylinder is so great it would cause the water introduced through the pipe 51 in Fig. 4 to flow out over the top of the cylinder, for this reason the inturned flange 49 is provided which causes the water to flow downwardly along the wall 47. In the modification shown in Fig. 1, the outwardly flaring wall 21 causes the water to flow from the inlet to the outlet end responsive to centrifugal force.

While we have shown the water being introduced through the pipe 51 at the upper end of the cylinder 43, in Fig. 4, it will be obvious that the water could be introduced equally well at the lower end of the cylinder by placing the flange 49 at the lower end. The centrifugal force created by the rotation of the cylinder 43 is such that the film of water formed on the outer wall 47, if restrained at the lower end, would flow out at the upper end. It will furthermore be apparent that the rotary cylinder may be of uniform diameter and be horizontally disposed, or be frusto-conical in shape and be vertically disposed.

In this specification I have referred to the members 13 and 43 as "cylinders." This term is intended to cover frusto-cylindrical elements such as 13 or any other cylinder-like element. Therefore, the term "cylinder-like element" used in the appended claims is used to include both a true cylinder and variations thereof unless a different meaning therefor is given.

While we have shown our invention in but two forms, it will be obvious to those skilled in the art that it is not so limited but is susceptible of various other changes and modifications without departing from the spirit thereof, and we desire, therefore, that only such limitations shall be placed thereupon as are specifically set forth in the appended claims.

What we claim is:

1. Apparatus for separating solid particles from a gas comprising an imperforate elongated cylinder-like element, radial vanes extending longitudinally of the cylinder-like element, an outer shell mounted on the vanes and extending the length of said element, said outer shell forming with the vanes a plurality of elongated channels, means to introduce gas containing solid particles into the channels, means to rotate the element at a velocity sufficient to impart to the solid particles a force of from 800 to 2,000 times gravity, means providing a film of water moving axially in the channels along the outer wall to entrain the solid particles, a casing surrounding the cylinder-like element and having a gas inlet for admitting gas into one end of the element, a nozzle ring fixedly mounted relative to said end of the element and extending a short distance inwardly of the outer imperforate wall thereof and spaced therefrom, a gas outlet adjacent the other end of the element including a second ring extending a short distance inwardly of the outer wall of the element at its discharge end and spaced therefrom, an annular ridge on the inside of the first mentioned ring to effect an increase in velocity and a decrease in pressure of gas at the inlet end, and means to discharge the water and solid particles entrained thereby adjacent the gas outlet separately from the gas.

2. Apparatus for separating solid particles from a gas comprising an elongated, imperforate horizontally disposed cylinder-like element smaller in diameter at one end than the other, a plurality of axially extending radial vanes mounted on said element and extending substantially the full length of the element, an outer imperforate wall open at the ends mounted on the vanes and surrounding the element and forming therewith a plurality of axially extending channels, an outer casing in which the element is mounted, said casing having an inlet at one end for gas to be cleaned adjacent the smaller diameter end of the element, a ring mounted in the inlet end and extending a short distance within the outer wall to direct the gas into the channels, a restricting ridge within the ring to increase the velocity of the gas, a conduit for water extending within the ring and the outer wall and having its discharge end directed against the outer wall, a gas outlet at the other end of the casing, a second ring mounted in the gas outlet and extending a short distance within the outer imperforate wall and spaced therefrom to separate cleaned gas from the water on the outer imperforate wall, and means to rotate the element at a velocity sufficient to cause solid particles to settle out of the gas and be entrained in the water along the imperforate wall.

References Cited in the file of this patent

UNITED STATES PATENTS

| 968,307 | Yawger | Aug. 23, 1910 |

FOREIGN PATENTS

| 17,250 of 1905 | Great Britain | Aug. 25, 1905 |
| 159,296 | Germany | Apr. 8, 1905 |
| 510,683 | Belgium | Apr. 30, 1952 |
| 630,198 | France | Aug. 13, 1927 |